United States Patent

Authement

[11] Patent Number: 5,347,745
[45] Date of Patent: Sep. 20, 1994

[54] CRAB TRAP FLOAT ROPE STOP

[76] Inventor: Donald J. Authement, 6053 Bayouside Dr., Chauvin, La. 70344

[21] Appl. No.: 150,889

[22] Filed: Nov. 12, 1993

[51] Int. Cl.$^5$ .................. A01K 93/00; B63B 22/18
[52] U.S. Cl. ........................... 43/44.91; 441/23
[58] Field of Search ............. 43/44.9, 44.91, 102, 43/105, 100, 4.5; 441/23, 6, 1

[56] References Cited

U.S. PATENT DOCUMENTS

| | | | |
|---|---|---|---|
| 2,393,070 | 6/1944 | Saloun | 43/44.9 |
| 2,509,704 | 5/1950 | Streitwieser | 43/44.9 X |
| 2,591,332 | 4/1952 | Benhensky | 43/44.91 X |
| 2,693,040 | 11/1954 | Atton | 43/44.9 |
| 2,700,238 | 1/1955 | Schrader | 43/44.91 |
| 2,712,194 | 7/1955 | Stefano | 43/44.91 |
| 2,755,589 | 7/1956 | Osborne | 43/44.9 |
| 2,847,792 | 8/1958 | Kuhlmann | 43/44.91 |
| 2,887,814 | 5/1959 | Chambers | 43/44.9 |
| 2,902,792 | 9/1959 | Friday | 43/44.91 |
| 3,197,914 | 8/1965 | Beverly | 43/44.91 |
| 3,967,407 | 7/1976 | Halbasch | 43/44.9 |
| 4,090,463 | 5/1978 | Söderberg | 43/44.91 |
| 4,445,295 | 5/1984 | Litrico | 43/102 |
| 4,644,681 | 2/1987 | Hutson | 43/44.91 |
| 4,845,885 | 7/1989 | Pacitti | 43/44.91 |

*Primary Examiner*—P. Austin Bradley
*Assistant Examiner*—Jeanne M. Elpel
*Attorney, Agent, or Firm*—James C. Wray

[57] ABSTRACT

A crab trap float has a hollow cylindrical center rope-receiving tube. A rope stop has a round cap and a tubular throat which fits down inside the float center tube. Circular ridge lips on the tubular throat hold it in the float. Rope grippers extend inward at the bottom of the tubular throat to tightly grip the rope as the tubular throat is pushed into the float. The inside of the smooth bore of the throat is grooved in a 4-leaf clover design for forming a gripper to hold the rope and to prevent the float from traveling along the rope. The rope is tied to the trap and is passed upward through the inside the float and through the tubular throat and its cap. Straightening the rope positions the float over the trap. A knot is tied on top of the cap. The top is jerked and the tubular throat of the gripper is forced down into the float, locking the rope in the gripper and the gripper in the float.

11 Claims, 2 Drawing Sheets

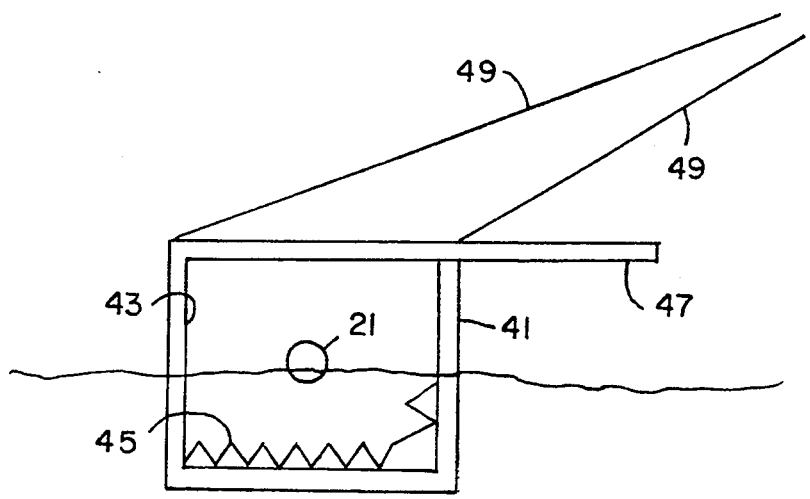
FIG. 4
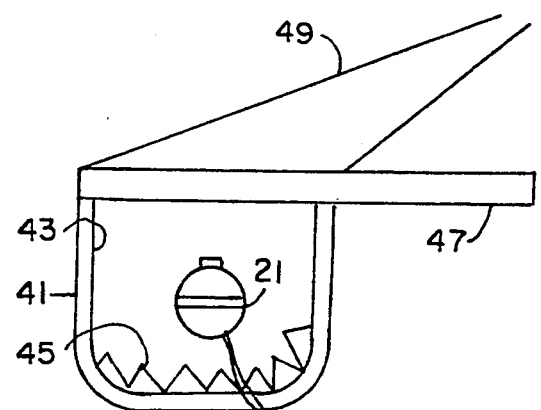
FIG. 5
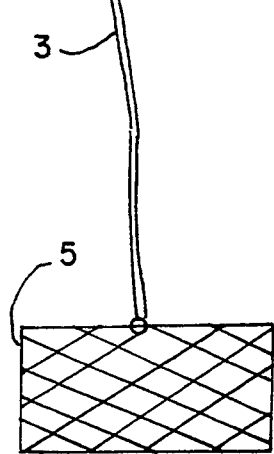

CRAB TRAP FLOAT ROPE STOP

BACKGROUND OF THE INVENTION

Crab traps are widely employed in coastal waters. One of the most prevalent floats is a cylindrical body of styrofoam through which a rope-receiving float tube extends. The tube is flared outward at inner and outer dimensions to hold the tube in the styrofoam ball and to allow rope contact around a smooth rounded surface rather than at an edge. Traditionally, a crab trap rope is attached to a crab trap. A knot is formed at a position which will be below the float and the free end of the rope is passed through the tube. Another knot is formed at the top of the tube, securing the rope to the float.

Crabs are harvested by moving an open top work boat at about five knots, and engaging the rope beneath the water line with teeth on a rack of a frame.

The rack and knot or the rack and float absorb the reactive force as the rope is stretched taut and the crab trap is lifted from the bottom. The rope is then grabbed with a hook or by hand and hauling the rope in releases the tension on the float, allowing the float to bob through the frame. The crab trap is hauled up to the boat and is emptied into the boat, and then is released back into the water, all while the boat is under way, headed toward the next float. By the time the trap is emptied, the next float may already be caught by the underwater rack.

To prevent the top knot from pulling through the float, it is customary to cut a short length of polyvinyl chloride pipe and to drill holes diametrically through the holes in the pipe and pass the rope through the pipe before tying the top knots. That increases longevity of the float and helps to prevent the rope from being pulled through the float, with the attendant loss of the crab trap.

The loss of the crab trap during harvesting is one of the worst problems that confronts a waterman crab harvester.

The bottom knot below the float is useful only to prevent the float from moving along the rope. If the float moves along the rope so that the float is displaced from the upper end of the rope, a jarring occurs during harvesting. That is because the rope slides through the rack, slides through the float and abruptly contacts the end of the rope, resulting in the jarring and possible loss of the crab trap.

Due to the floating and bobbing of the float, there is much pushing and pulling on the knots and the knots tend to work loose. As the rope and float are engaged by the rack during harvesting, it is not unusual for the top knot, which has been loosened by wave action or repeated harvesting, to become totally untied, allowing the float to slip off the rope and resulting in the loss of the crab trap.

A long-standing need has existed to create a better float-rope connection for crab harvesting cages.

The prior method of securing a float to a crab trap required several steps:

Step One: Purchase a 20 ft. length of PVC pipe.
Step Two: Cut the PVC pipe into approximately 3 inch lengths.
Step Three: Drill ¼ inch diametrical holes in the center of the 3 inch piece.
Step Four: Thread a ¼ inch rope through the holes in the 3 inch piece of PVC pipe.
Step Five: Tie a double knot above the 3 inch piece of PVC pipe to prevent its slipping out.
Step Six: Thread the ¼ inch rope (15 ft. to 18 ft. long, depending on depth of water) through the float.
Step Seven: Tie another knot close against the bottom of the float to limit any free travel of the float between the knot and the PVC pipe piece.
Step Eight: Secure the loose end of the ¼ inch rope to the crab cage.

Each piece of 3 inch long PVC is cut by hand of power saw. The holes drilled in the center of each 3 inch piece are often distorted because of the heat generated by the drill bit. Threading the rope through the holes is difficult because of the distorted holes. Then, the knot under the float is tied to prevent free travel of the float along the rope caused by the current bobbing the float up and down. That process is used to prevent the loss of crab traps when only a knot is used in the top of the float. Also, the bobbing action frequently loosens the knot below the float, thereby allowing slack between the float and the 3 inch piece of PVC pipe on top. When this occurs, the jarring brought about by retrieving the cage causes the knot to untie, and the crab cage is lost.

In the retrieval of a crab cage, teeth on a rack are below a waterline to enable retrieving of the float which is attached to the crab cage.

With the boat traveling at approximately 5 knots, the rack teeth trap the float, latching it, and retrieve the crab trap from the bottom of the water, surfacing it for emptying the cage of its contents. When the cage is full, making it heavier, the jarring action upon latching the float is significantly increased, especially if there is any free travel of the float on the rope.

A need exists for an improved rope-crab trap float attachment.

SUMMARY OF THE INVENTION

The present invention prevents a float attached to a crab cage from drifting along an attached rope.

When drifting occurs, slack is allowed under the float. When retrieving cages by latching the float, a jarring occurs between the float and the stop that causes the float to be damaged. The crab cage can be lost when jerked free of the float marker.

The stop of the present invention is inserted into the float, disallowing any free slack from occurring between the attached rope and the float. Increased efficiency is obtained when retrieving and unloading crab cages. This invention, therefore, allows faster production and less down time.

Installation of the present stop is simple, quick and allows the preparation time of the cages to be shortened and easier when replacing lost cages and when initially placing crab cages.

The new stop is inserted into an existing float and is held in place by anchor cups, three ridged lips, on the throat, for preventing its slipping out. Also, there is an internal structure to prevent the styrofoam or cork float from drifting along the rope placed through the center of the new stop and the cork float. The internal structure of the new stop favors in appearance a four-leaf clover. That structure stops the float from traveling up and down the rope.

The invention can be used in any float application where drifting of the float is a nuisance and causes damage or loss when retrieved. Sizes of the stops are provided for all standard tubes in float bodies.

Installation of the new stop is simple, time conservative, cost effective and efficient.

The installation of the present stop is easier than the multi-step prior art process and requires fewer steps:

Step One: Thread a ¼ inch rope through the present stop and a tie knot above the stop.

Step Two: Thread the loose end of a ¼ inch rope through the float until the new stop touches the top of the float, automatically aligning itself.

Step Three: Jerk firmly on the ¼ inch rope below the float, thereby inserting the new stop into the top of the float.

Step Four: Secure the ¼ rope to the cage trap.

When using the new stop the jarring action is minimized, even if the cage is full. It prevents free travel of the float on the rope. Loss of cages is greatly reduced to almost nil.

A crab trap float has a hollow cylindrical center. A stop has a round top and a tube which fits down inside the float center. Circular ridge lips on the tube hold it in the float. Rope grippers extend inward at the bottom of the tube to tightly grip the rope as the tube is pushed into the float. The inside of the smooth bore is grooved in a 4-leaf clover design for forming a gripper to hold the rope and to prevent the float from traveling along the rope. The rope is tied to the trap and is passed upward through the inside of the float and through the stop and its cap. Straightening the rope positions the float over the trap. The tube of the gripper is pushed down into the float, locking the rope in the gripper and the gripper in the float.

A preferred crab trap float rope stop assembly has a spherical crab trap float made of two semi-spherical sections formed together around a central abrasion-resistant tube. The tube has flared ends. A crab trap rope extends through the abrasion-resistant tube. A stop surrounds the rope, and the stop has an enlarged upper end for abutting an upper end of the float tube and for preventing movement of the stop through the float tube. A depending tubular throat is connected to and extends downward from the enlarged end. The tubular throat has plural external, generally radially extending anchors for permitting movement of the tubular throat and anchors into an upper end of the float tube and for preventing outward movement of the stop, the throat and the anchors from the float tube, for anchoring the throat, anchors and stop in the float. A plurality of rope-gripping extensions extend inward from the throat for jamming inward against a rope as the throat, and anchors are moved radially inward upon being compressed in the float tube for preventing movement of the rope through the stop.

The anchors have plural, generally radial extensions on the throat for compressing against an inner cylindrical wall of the float tube.

The preferred anchors have plural cup-shaped anchors circumferentially extending from the throat and extending radially outward and upward toward the enlarged head for facilitating inward movement in the float tube, and for gripping and preventing outward movement from the float tube.

The throat is longitudinally divided to facilitate compression upon insertion into the float tube.

The preferred grippers have plural leaf-shaped inward extensions on an end of the throat remote from the enlarged head for gripping the rope.

These and further and other objects and features of the invention are apparent in the disclosure, which includes the above and ongoing written specification, with the claims and the drawings.

BRIEF DESCRIPTION OF THE DRAWINGS

FIG. 4 is a schematic representation of apparatus for harvesting crabs.

FIG. 5 is a schematic representation of a crab cage being harvested.

DETAILED DESCRIPTION OF THE DRAWINGS

Figure 1:
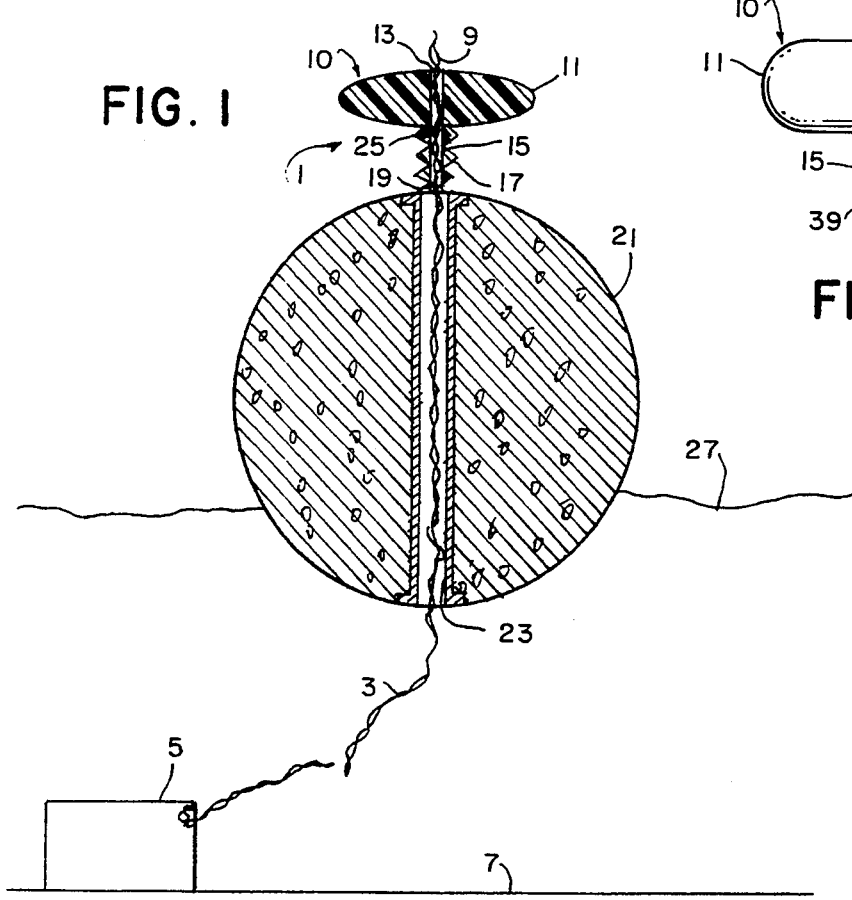
FIG. 1 is a schematic representation of a stop used with a float and a crab cage.

Referring to FIG. 1, a float rope and stop assembly is generally indicated by the numeral 1. Rope 3 is attached at its distal end to a crab pot, crab cage or crab trap 5, which rests on the sea bottom 7.

An upper end 9 of the rope 3 is knotted. Then the rope is passed through a stop 10, which has an enlarged head end 11 with a central opening 13, and a dependent cylindrical throat 15 with outward-extending anchors 17. Inward extensions 19 tightly grip the rope 3 as the rope is pulled downward in the float 21, compressing the throat and anchor ridges 17 inward against the walls of the central tube 23, and compressing the inner extensions 19 inward against the rope 3, thereby locking the upper end 25 of the rope in the stop 10 and in the float 21.

As the float 21 bobs on the upper surface 27 of the water, there is no action of the float against the knot 9 and there is no tendency to untie the knot 9. Even if the knot 9 were untied, the principal purpose of the knot 9 is accomplished when the knot is used to pull the throat 15 and anchors 17 of the stop into the central tube 23 of the float 21. The rope cannot be released from the float or the stop without destroying the float or the stop, or both.

Figure 2:
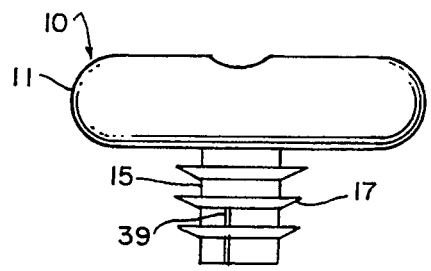
FIG. 2 is a cross-sectional view of the stop.

As shown in FIG. 2, the stop has an enlarged upper head end 11 which may be a circular disc or, more preferably, an elliptical body. In one form, the anchors 17 are cup-shaped, as shown in FIG. 2, to facilitate insertion of the anchors 17 and throat 15 into the tube 23, but to tighten and spread and resist outward movement of the throat and anchors. Slits 39 allow the throat 15 to compress inwardly in tube 23.

Figure 3B:
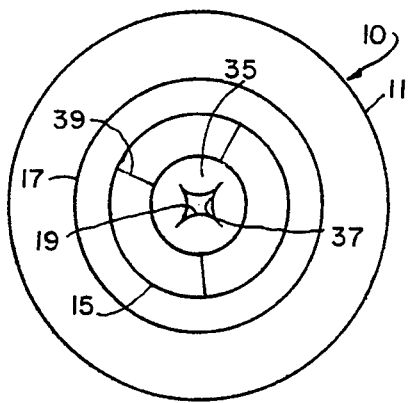
FIG. 3B is an end elevation of the stop.
Figure 3A:
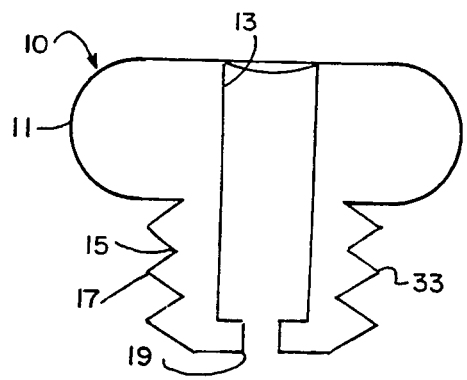
FIG. 3A is a side elevation of the stop.

As shown in FIG. 3A, a smooth bore 13 extends through the elliptical head 11 and through the throat 15. The anchors 17 may have triangular cross-sectional form with points 33 for digging into or tightly gripping the inner wall of the central tube 23 in the float 21.

It should be pointed out that once the stop 10 is assembled in the float 21, there is substantially no force which tends to remove the stop from the float. Forces are encountered during harvesting of crabs and lifting of the traps, which push the float towards the stop 10 and towards the enlarged head 11, while the inward extensions 19 are tightly gripping the rope.

As shown in FIG. 3B, the internal gripping structure 19 has the appearance of inward-extending leaves 35 of a four-leaf clover. As the inner edges 37 of the leaves 35 are pressed against the rope by insertion of the stop 10 and throat 15 in the tube 23 of the float 21, the inward edges 37 dig into and deform the rope, tightly engaging the rope and preventing movement of the float along the rope. The throat 15 may be fluted or slit 39 longitudinally to facilitate inward compression and locking of the anchors in the tube 23.

FIG. 4 shows a harvesting arrangement for crab traps. A retrieving rack 41 has a rectangular opening 43 with teeth 45 on a lower edge and an inner side edge. The rack is mounted on an arm 47 which is extended from a boat. Cables 49 are attached to the bow of the boat. The boat is steered toward a cork float 21.

As shown in FIG. 5 from the front view, the cork float is received in the opening 43 of the frame. The rope slides through the teeth 45 with the boat moving at about 5 knots. The float 21 is pulled against the teeth 45. The rope 3 tightens and lifts the crab cage 5 from the bottom. Because of the speed of the boat and the resistance to movement of the crab cage, the crab cage tends to rise toward the surface as a pendulum. The crab cage is lifted and its contents are emptied into the boat. Lifting the trap releases the tension on the rope. The cork float bobs up and out of engagement with the teeth, and the continued motion of the boat pulls the floating cork at the end of the untensioned rope forward through the retrieving rack 41. The emptied crab cage 5 is dropped back to the bottom, and the float 21 resumes its position on the surface.

At the next harvesting cycle, the boat is maneuvered in the opposite direction so that after the second harvesting, the crab cages 5 are returned to approximately their original positions.

The present invention avoids the loss of crab cages 5 by preventing loss of the rope 3 through the float 21 due to loosening of knots. The invention results in a rapid installation procedure, and also results in improved performance and prevents relative movement of the rope and float when the float bobs on the surface of the water, which subjects the float to potential damage, the knots to loosening and the crab cages to loss.

While the invention has been described with reference to specific embodiments, modifications and variations of the invention may be constructed without departing from the scope of the invention, which is defined in the following claims.

I claim:

1. A crab trap float rope stop assembly, comprising a spherical crab trap float formed around a central abrasion-resistant float tube, a crab trap rope extending through the abrasion-resistant tube, a stop surrounding the rope, the stop having an enlarged upper end for abutting an upper end of the float tube and for preventing movement of the stop through the float tube, a depending tubular throat connected to and extending downward from the enlarged end, the tubular throat having plural external, generally radially extending anchors for permitting movement of the tubular throat and anchors into an upper end of the float tube and for preventing outward movement of the stop, the throat and the anchors extending from the throat into contact with the float tube for anchoring the throat, anchors and stop in the float, a plurality of rope-gripping extensions extending inward from the throat for jamming inward against a rope as the throat and anchors are deformed radially inward upon being compressed in the float tube for preventing movement of the rope through the stop.

2. The assembly of claim 1, wherein the anchors comprise plural, generally radial extensions on the throat for compressing the throat and the anchors against an inner cylindrical wall of the float tube.

3. The assembly of claim 1, wherein the anchors comprise plural cup-shaped anchors circumferentially extending from the throat and extending radially outward toward the tube and upward toward the enlarged head for facilitating inward movement of the throat and anchors in the float tube, and for gripping and preventing outward movement of the anchors from the float tube.

4. The assembly of claim 1, wherein the rope gripping extensions comprise plural leaf-shaped inward extending grippers on an end of the throat remote from the enlarged head for gripping the rope.

5. The assembly of claim 1, wherein the rope gripping extensions comprise plural leaf-shaped inward extending grippers on an end of the throat remote from the enlarged head for gripping the rope, and wherein the anchors comprise plural, radial extensions on the throat for compressing the throat and anchors against an inner cylindrical wall of the float tube and compressing the grippers on the rope.

6. A crab cage float rope stop apparatus, comprising a stop for surrounding and engaging a crab cage rope, the stop having an enlarged upper end for abutting an upper end of a float tube in a crab cage float and for preventing movement of the stop through the float tube, a depending tubular throat connected to and extending downward from the enlarged end, the tubular throat having plural external, generally radially extending anchors for permitting movement of the tubular throat and anchors into an upper end of the float tube and for preventing outward movement of the stop, the throat and the anchors from the float tube for anchoring the throat, anchors and stop in the float, a plurality of rope-gripping extensions extending inward from the throat for jamming inward against a crab cage attached rope as the throat and anchors are moved radially inward upon being compressed in the tube for preventing movement of the rope through the stop.

7. The apparatus of claim 6, wherein the anchors comprise plural, generally radial extensions on the throat for compressing against an inner cylindrical wall of the tube.

8. The apparatus of claim 6, wherein the anchors comprise plural cup-shaped anchors circumferentially extending from the throat and extending radially outward toward the tube and upward toward the enlarged head for facilitating inward movement into the tube, and for gripping and preventing movement outward from the tube.

9. The apparatus of claim 6, wherein the rope gripping extensions comprise plural leaf-shaped inward extending grippers on an end of the throat remote from the enlarged head for gripping the rope.

10. The apparatus of claim 6, wherein the rope gripping extensions comprise plural leaf-shaped inward extending grippers on an end of the throat remote from the enlarged head for gripping the rope, and wherein the anchors comprise plural, generally radial extensions on the throat for compressing the throat and the anchors against an inner cylindrical wall of the float tube and compressing the grippers inward against the rope.

11. A method of installing a crab cage and float, comprising tying a knot in a first end of the rope, passing the rope through a smooth opening in a stop with a cap and a throat and through separated inward extending grippers in the throat, passing the rope through a tube extending through a float, jerking sharply on the rope and pulling the throat into the tube, compressing anchors extending from the throat in the tube and anchoring the anchors and throat in the tube, gripping the rope by compressing the grippers against the rope, pulling the cap up against an end of the tube, and tying the second end of the rope to a crab cage.

* * * * *